(12) United States Patent
Qiu et al.

(10) Patent No.: US 10,887,533 B2
(45) Date of Patent: Jan. 5, 2021

(54) INFRARED CROSSTALK COMPENSATION METHOD AND APPARATUS THEREOF

(71) Applicant: REALTEK SEMICONDUCTOR CORP., Hsinchu (TW)

(72) Inventors: Zhong-Yi Qiu, Hsinchu (TW); Wen-Tsung Huang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 13 days.

(21) Appl. No.: 16/380,708

(22) Filed: Apr. 10, 2019

(65) Prior Publication Data

US 2020/0112696 A1   Apr. 9, 2020

(30) Foreign Application Priority Data

Oct. 8, 2018   (TW) .............................. 107135468 A

(51) Int. Cl.
*H04N 5/33*  (2006.01)
*H04N 9/64*  (2006.01)
*G06T 5/00*  (2006.01)

(52) U.S. Cl.
CPC ............. *H04N 5/332* (2013.01); *G06T 5/002* (2013.01); *H04N 9/646* (2013.01); *G06T 2207/10048* (2013.01)

(58) Field of Classification Search
CPC ........ H04N 5/332; H04N 9/646; G06T 5/002; G06T 2207/10048
See application file for complete search history.

(56) References Cited

U.S. PATENT DOCUMENTS

| 6,108,612 | A  | * | 8/2000 | Vescovi ............... | G06K 7/1443 235/469 |
| 2003/0059087 | A1 | * | 3/2003 | Waslowski ............... | G01V 8/20 382/103 |
| 2005/0046703 | A1 | * | 3/2005 | Cutler ....................... | G06T 7/30 348/223.1 |
| 2007/0177026 | A1 | * | 8/2007 | Sasaki ..................... | H04N 9/735 348/222.1 |
| 2009/0109507 | A1 | * | 4/2009 | Suzuki ................... | G06K 15/02 358/521 |

(Continued)

FOREIGN PATENT DOCUMENTS

EP   0660591 B1   11/2001

*Primary Examiner* — Blake C Riddick
(74) *Attorney, Agent, or Firm* — Birch, Stewart, Kolasch & Birch, LLP

(57) ABSTRACT

An infrared crosstalk compensation method includes capturing an original image of a scene, where the original image includes a plurality of original pixels, the original pixels are arranged in a two-dimensional array according to a first axial direction and a second axial direction, and each original pixel has a red subpixel value, a green subpixel value, a blue subpixel value, and an infrared subpixel value. The method further includes: obtaining compensated values of the red, green, blue, and infrared subpixel values according to the original image, a compensation axial direction, a plurality of red, green, blue compensation coefficients corresponding to the compensation axial direction, and compensation equations; and obtaining a compensated image according to the compensated values of the red, green, blue, and infrared subpixel values.

8 Claims, 7 Drawing Sheets

(56) References Cited

U.S. PATENT DOCUMENTS

| | | | |
|---|---|---|---|
| 2010/0195902 A1* | 8/2010 | Horovitz | H04N 1/603 |
| | | | 382/162 |
| 2012/0257030 A1* | 10/2012 | Lim | A61B 1/00009 |
| | | | 348/70 |
| 2013/0135272 A1 | 5/2013 | Park | |
| 2014/0354773 A1* | 12/2014 | Venkataraman | G02B 3/0056 |
| | | | 348/43 |
| 2015/0116707 A1* | 4/2015 | Tatsuda | G01J 3/32 |
| | | | 356/326 |
| 2015/0138561 A1* | 5/2015 | Sano | G02B 26/001 |
| | | | 356/454 |
| 2019/0087968 A1* | 3/2019 | Grunnet-Jepsen | H04N 13/254 |
| 2019/0378257 A1* | 12/2019 | Fan | H04N 9/67 |
| 2019/0378258 A1* | 12/2019 | Fan | H04N 5/33 |

\* cited by examiner

INFRARED CROSSTALK COMPENSATION METHOD AND APPARATUS THEREOF

CROSS-REFERENCE TO RELATED APPLICATION

This non-provisional application claims priority under 35 U.S.C. § 119(a) to Patent Application No. 107135468 in Taiwan, R.O.C. on Oct. 8, 2018, the entire contents of which are hereby incorporated by reference.

BACKGROUND

Technical Field

This application relates to the field of infrared crosstalk, and in particular, to an infrared crosstalk compensation method for image sensing and an apparatus thereof.

Related Art

An image sensor is an apparatus that converts a light signal into an electric signal, and is also referred to as a light-sensing component. Image sensors are used only in photography devices in early days, but nowadays are standard equipment on mobile apparatuses. An image sensor includes a charge-coupled device (CCD) or a complementary metal-oxide-semiconductor (CMOS). For more details of the structure and function of the image sensor, the image sensor has color filters and light-sensing pixels. The color filters are configured to separate areas that receive red light, green light, and blue light. In an area that receives red light, a color filter allows only red light to pass through. In an area that receives green light, a color filter allows only green light to pass through. In an area that receives blue light, a color filter allows only blue light to pass through. The light-sensing pixels are configured to sense the red, green, and blue light that pass through the color filters. Currently, image sensors still focus on receiving visible light. Therefore, an infrared cut filter (IR cut filter) is further provided in the structure of an image sensor. The IR cut filter is configured to filter out infrared light, so as to prevent infrared crosstalk from distorting visible light sensed by light-sensing pixels.

However, mobile apparatuses tend to provide varied photographing functions in recent years. Users' demands for night-vision photography and infrared video recording receive a gradually increasing attention. Therefore, an IR cut filter needs to be removed from an image sensor to provide a function of receiving infrared light and meet the demands. However, after the IR cut filter is removed from the image sensor, red, green, and blue light sensed by the image sensor are exposed to infrared crosstalk and a color washout phenomenon is caused. Currently, there is still no solution to the problem of infrared crosstalk in manufacturing technologies of image sensors.

SUMMARY

In view of the foregoing, this application provides an infrared crosstalk compensation method and an apparatus thereof.

According to some embodiments, an infrared crosstalk compensation apparatus includes an image capture circuit and a control circuit. The image capture circuit is configured to capture an original image of a scene, where the original image includes a plurality of original pixels, the original pixels are arranged in a two-dimensional array according to a first axial direction and a second axial direction, and each original pixel has an R subpixel value, a G subpixel value, a B subpixel value, and an IR subpixel value. The control circuit is configured to: obtain compensated values of the R, G, B, and IR subpixel values according to the original image, a compensation axial direction, a R compensation coefficient corresponding to the compensation axial direction, a G compensation coefficient corresponding to the compensation axial direction, a B compensation coefficient corresponding to the compensation axial direction, and compensation equations, and output a compensated image according to the compensated values of the R, G, B, and IR subpixel values.

The compensation equations are:

$$R_o = R_i - K_{rf}(v) * IR_i,$$

$$G_o = G_i - K_{gf}(v) * IR_i,$$

$$B_o = B_i - K_{bf}(v) * IR_i, \text{ and}$$

$$IR_o = IR_i, \text{ where}$$

v is a coordinate value of each original pixel in the compensation axial direction, $R_i$, $G_i$, $B_i$, and $IR_i$ are R, G, B, and IR subpixel values of an original pixel whose coordinate value is i in the compensation axial direction, $R_o$, $G_o$, $B_o$, and $IR_o$ are compensated values of R, G, B, and IR subpixel values of an original pixel whose coordinate value is v in the compensation axial direction, and $K_{rf}(v)$, $K_{gf}(v)$, $K_{bf}(v)$ are the R, G, B compensation coefficients of the original pixel whose coordinate value is v in the compensation axial direction.

According to some embodiments, the infrared crosstalk compensation apparatus further includes an image display apparatus, configured to display the compensated image.

According to some embodiments, the infrared crosstalk compensation apparatus further includes a storage apparatus, configured to store the compensated image.

According to some embodiments, the control circuit is configured to obtain the R, G, B compensation coefficients according to a compensation coefficient obtaining procedure, where the compensation coefficient obtaining procedure includes: capturing a reference image of a black reference object, where the reference image includes a plurality of reference pixels, the reference pixels are arranged in a two-dimensional array according to the first axial direction and the second axial direction, and each reference pixel has an R reference value, a G reference value, a B reference value, and an IR reference value; obtaining the compensation axial direction, a plurality of regions, a plurality of R regional compensation values, a plurality of G regional compensation values, and a plurality of B regional compensation values according to a direction determining procedure, where each regional compensation value corresponds to each region; and obtaining the R, G, B compensation coefficients corresponding to the compensation axial direction according to a R compensation coefficient equation, a G compensation coefficient equation, a B compensation coefficient equation, and the regional compensation values.

The R compensation coefficient equation is $$K_{rf}(v) = \begin{cases} K_{r1}, & v \le v_1 \\ K_{r1} + (K_{r2} - K_{r1}) * \frac{v - v_1}{v_2 - v_1}, & v_1 \le v \le v_2 \\ \vdots & \vdots \\ K_{r(n-1)} + (K_{rn} - K_{r(n-1)}) * \frac{v - v_{n-1}}{v_n - v_{n-1}}, & v_{n-1} \le v \le v_n \\ K_{rn}, & v \ge v_n \end{cases},$$

the G compensation coefficient equation is $$K_{gf}(v) = \begin{cases} K_{g1}, & v \le v_1 \\ K_{g1} + (K_{g2} - K_{g1}) * \frac{v - v_1}{v_2 - v_1}, & v_1 \le v \le v_2 \\ \vdots & \vdots \\ K_{g(n-1)} + (K_{gn} - K_{g(n-1)}) * \frac{v - v_{n-1}}{v_n - v_{n-1}}, & v_{n-1} \le v \le v_n \\ K_{gn}, & v \ge v_n \end{cases},$$

and
the B compensation coefficient equation is $$K_{bf}(v) = \begin{cases} K_{b1}, & v \le v_1 \\ K_{b1} + (K_{b2} - K_{b1}) * \frac{v - v_1}{v_2 - v_1}, & v_1 \le v \le v_2 \\ \vdots & \vdots \\ K_{b(n-1)} + (K_{bn} - K_{b(n-1)}) * \frac{v - v_{n-1}}{v_n - v_{n-1}}, & v_{n-1} \le v \le v_n \\ K_{bn}, & v \ge v_n \end{cases},$$

where v is a coordinate value of each reference pixel in the compensation axial direction, $K_{r1}, K_{r2}, \ldots,$ and $K_{rn}$ are the R regional compensation values, $K_{g1}, K_{g2}, \ldots,$ and $K_{gn}$ are the G regional compensation values, $K_{b1}, K_{b2}, \ldots,$ and $K_{bn}$ are the B regional compensation values, $v_1, v_2, \ldots,$ and $v_n$ are coordinate values of the regions in the compensation axial direction, and $K_{rf}(v), K_{gf}(v), K_{bf}(v)$ are the R, G, B compensation coefficients of an original pixel whose coordinate value is v in the compensation axial direction.

According to some embodiments, the direction determining procedure includes: obtaining an initial regional block and a final regional block according to a region determining procedure, where the region determining procedure includes: adjusting a R operation variable, a G operation variable, and a B operation variable by ranges according to calibration equations and each reference pixel, and obtaining a dark regional block corresponding to each range; obtaining the compensation axial direction according to the initial regional block and the final regional block; and obtaining the regions and the regional compensation values according to the compensation axial direction.

The calibration equations are:

$R_o = R_i - c_r * IR_i,$ $G_o = G_i - c_g * IR_i,$ and $B_o = B_i - c_b * IR_i,$ where $c_r$ is the R operation variable, $c_g$ is the G operation variable, $c_b$ is the B operation variable, $R_i$ is the R reference value, $G_i$ is the G reference value, $B_i$ is the B reference value, $IR_i$ is the IR reference value, $R_o$ is an R compensated reference value, $G_o$ is a G compensated reference value, and $B_o$ is a B compensated reference value.

According to some embodiments, an infrared crosstalk compensation method includes: capturing an original image of a scene, where the original image includes a plurality of original pixels, the original pixels are arranged in a two-dimensional array according to a first axial direction and a second axial direction, and each original pixel has an R subpixel value, a G subpixel value, a B subpixel value, and an IR subpixel value; obtaining compensated values of the R, G, B, and IR subpixel values according to the original image, a compensation axial direction, a R compensation coefficient corresponding to the compensation axial direction, a G compensation coefficient corresponding to the compensation axial direction, a B compensation coefficient corresponding to the compensation axial direction, and compensation equations; and obtaining a compensated image according to the compensated values of the R, G, B, and IR subpixel values.

According to some embodiments, the infrared crosstalk compensation method further includes a method for obtaining an infrared crosstalk compensation coefficient.

According to some embodiments, the method for obtaining an infrared crosstalk compensation coefficient includes: capturing a reference image of a black reference object, where the reference image includes a plurality of reference pixels, the reference pixels are arranged in a two-dimensional array according to the first axial direction and the second axial direction, and each reference pixel has an R reference value, a G reference value, a B reference value, and an IR reference value; obtaining a compensation axial direction, a plurality of regions, a plurality of R regional compensation values, a plurality of G regional compensation values, and a plurality of B regional compensation values according to a direction determining procedure, where each R, G, B regional compensation value corresponds to each region; and obtaining the R, G, B compensation coefficients corresponding to the compensation axial direction according to a R compensation coefficient equation, a G compensation coefficient equation, a B compensation coefficient equation, and the regional compensation values.

In conclusion, the infrared crosstalk compensation method and the apparatus thereof according to this application are suitable for compensating for an original image having infrared crosstalk, and original pixels are compensated for according to the R, G, B compensation coefficients corresponding to a compensation axial direction and an IR subpixel value, so as to effectively reduce the infrared crosstalk in the original image. In some embodiments, the R, G, B compensation coefficients corresponding to the compensation axial direction are adjusted according to the regions and the regional R, G, B compensation values, so that the objective of compensating for infrared crosstalk is further achieved.

DETAILED DESCRIPTION

This application relates to infrared crosstalk compensation. Although several preferred modes of implementing this application are described in this specification, it should be understood that this application may still be implemented in various manners and should not be limited to the following specific embodiments or specific manners of implementing the following features. In other cases, well known details are not described or discussed again to avoid blurring the focus of this application.

Figure 1:
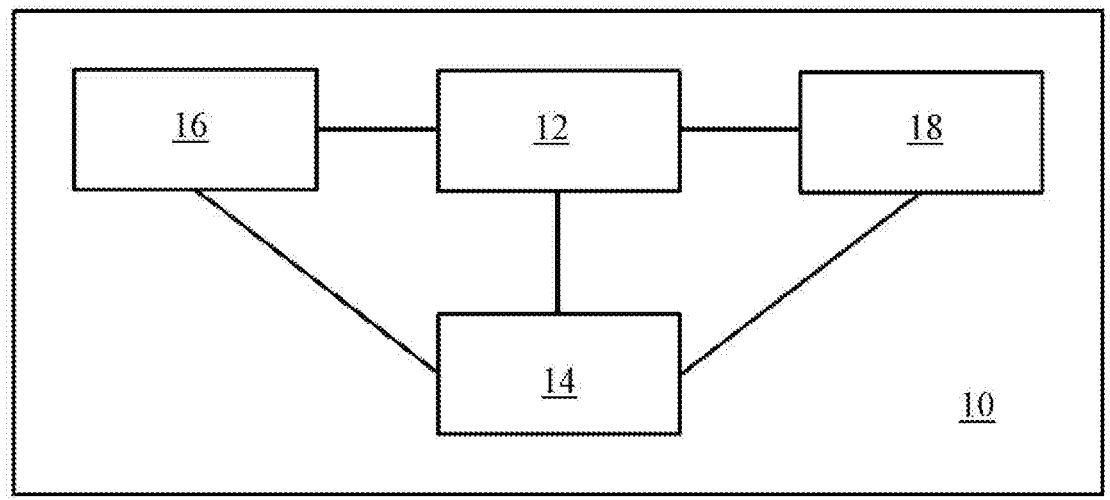
FIG. 1 is a schematic diagram of an infrared crosstalk compensation apparatus according to some embodiments of this application.

FIG. 1 is a schematic diagram of an infrared crosstalk compensation apparatus according to some embodiments of this application. In some embodiments, an infrared crosstalk compensation apparatus 10 is configured in a terminal device. The terminal device is, for example, but is not limited to, a mobile phone, a tablet computer, a notebook computer, a desktop computer, a photography device or a smart wearable device.

Referring to FIG. 1, in some embodiments, the infrared crosstalk compensation apparatus 10 includes an image capture circuit 12 and a control circuit 14. The image capture circuit 12 is configured to capture an original image of a scene. The control circuit 14 is configured to output a compensated image according to a compensation axial direction D3, a R compensation coefficient (that is, a red compensation coefficient) corresponding to the compensation axial direction D3, a G compensation coefficient (that is, a green compensation coefficient) corresponding to the compensation axial direction D3, a B compensation coefficient (that is, a blue compensation coefficient) corresponding to the compensation axial direction D3, and compensation equations.

Referring to FIG. 1, according to some embodiments, the infrared crosstalk compensation apparatus 10 further includes an image display apparatus 16, configured to display the compensated image. The image display apparatus 16 is, for example, but is not limited to, a liquid crystal display, a light-emitting diode display, and an organic light-emitting diode display.

Still referring to FIG. 1, according to some embodiments, the infrared crosstalk compensation apparatus 10 further includes a storage apparatus 18, configured to store the compensated image. The storage apparatus 18 is, for example but is not limited to, a volatile memory, a read-only memory, a flash memory, and a magnetic disk.

In some embodiments, the original image includes a plurality of original pixels. The original pixels are arranged in a two-dimensional array according to a first axial direction D and a second axial direction D2. Each original pixel has an R subpixel value (that is, a red subpixel value), a G subpixel value (that is, a green subpixel value), a B subpixel value (that is, a blue subpixel value), and an IR subpixel value (that is, an infrared subpixel value).

Next, the control circuit 14 obtains compensated values of the R, G, B, and IR subpixel values, and then outputs the compensated image according to the compensated values of the R, G, B, and IR subpixel values.

The compensation equations are:

$R_o = R_i - K_{rf}(v) * IR_i,$ $G_o = G_i - K_{gf}(v) * IR_i,$ $B_o = B_i - K_{bf}(v) * IR_i,$ and $IR_o = IR_i,$ where v is a coordinate value of each original pixel in the compensation axial direction D3. $R_i$, $G_i$, $B_i$, and $IR_i$ are the R, G, B, and IR subpixel values of an original pixel whose coordinate value is v in the compensation axial direction D3. $R_o$, $G_o$, $B_o$, and $IR_o$ are compensated values of R, G, B, and IR subpixel values of an original pixel whose coordinate value is v in the compensation axial direction D3. $K_{rf}(v)$ is the R compensation coefficient of the original pixel whose coordinate value is v in the compensation axial direction D3, $K_{gf}(v)$ is the G compensation coefficient of the original pixel whose coordinate value is v in the compensation axial direction D3, $K_{bf}(v)$ is the B compensation coefficient of the original pixel whose coordinate value is v in the compensation axial direction D3. $K_{rf}(v) * IR_i$ is a R compensation value (that is, a red compensation value) of the original pixel whose coordinate value is v in the compensation axial direction D3, $K_{gf}(v) * IR_i$ is a G compensation value (that is, a green compensation value) of the original pixel whose coordinate value is v in the compensation axial direction D3, $K_{bf}(v) * IR_i$ is a B compensation value (that is, a blue compensation value) of the original pixel whose coordinate value is v in the compensation axial direction D3.

Specifically, in some embodiments, the R, G, and B subpixel values include, in addition to grayscale values of brightness of respective colors, infrared crosstalk values. Therefore, the R, G, and B subpixel values are distorted under the effect of infrared crosstalk and cannot represent brightness of respective colors. The corresponding R, G, B compensation values (in some embodiments, the R, G, B compensation values are close to the infrared crosstalk values) need to be subtracted from the R, G, and B subpixel values to generate the compensated values of the R, G, B, and IR subpixel values that can effectively represent brightness of respective colors. The compensated values of the IR subpixel values are equal to the original IR subpixel values, because the IR subpixel values represent brightness of respective infrared light and are insusceptible to other crosstalk values. The R, G, B compensation coefficient is adjusted according to a coordinate value of the original pixel in the compensation axial direction D3. Therefore, the R, G, B compensation values in corresponding positions may be further adjusted based on the distribution of infrared crosstalk, thereby achieving effective infrared crosstalk compensation.

Figure 2A:
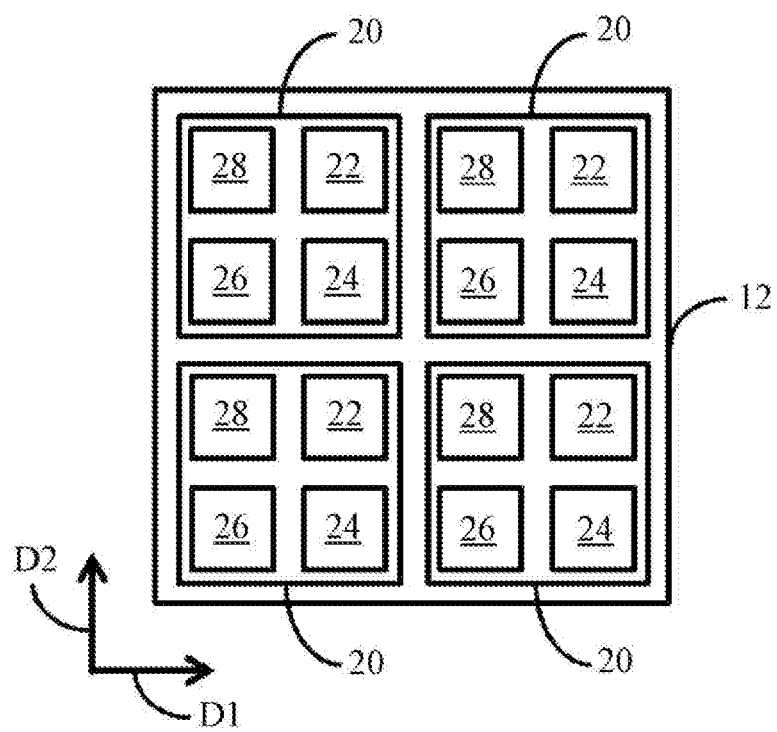
FIG. 2A to FIG. 2E are schematic diagrams of a sensing circuit according to some embodiments of this application.
Figure 2B:
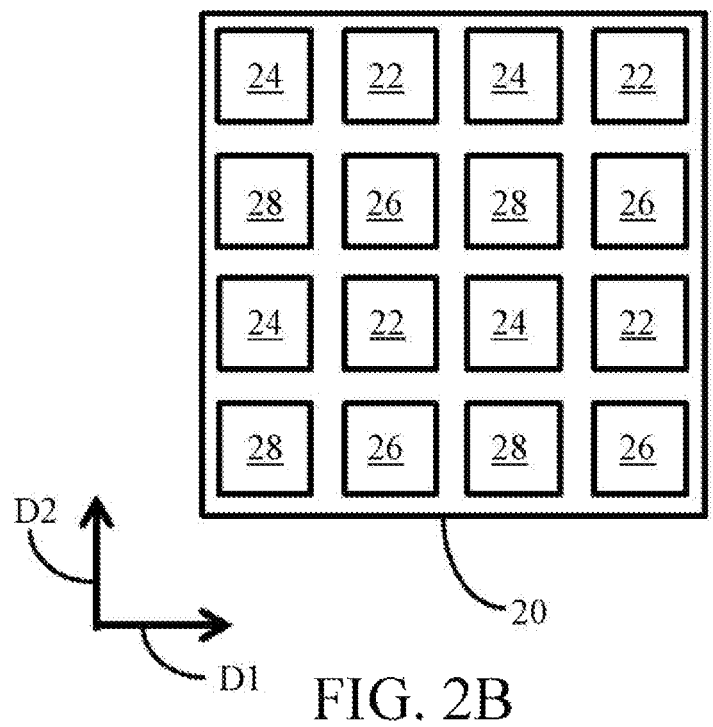
Figure 2C:
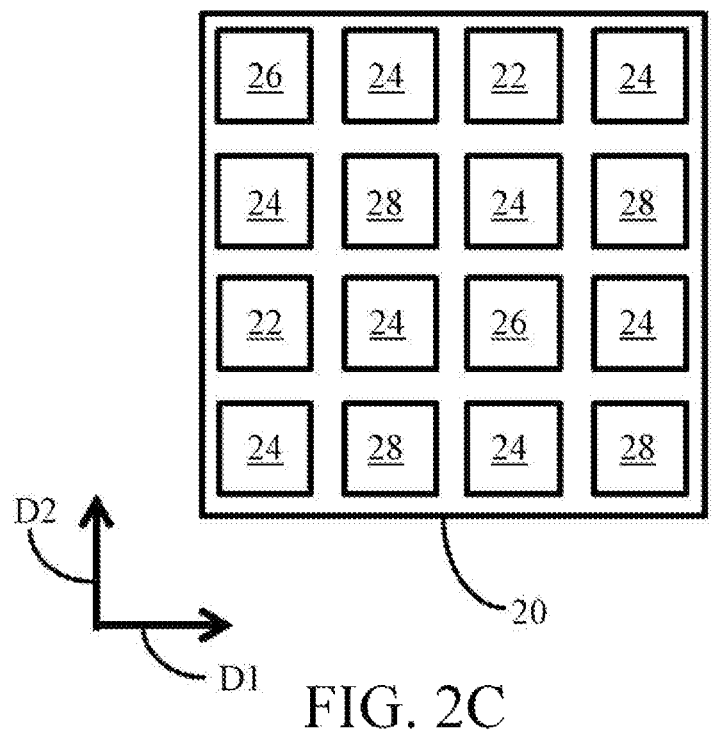
Figure 2D:
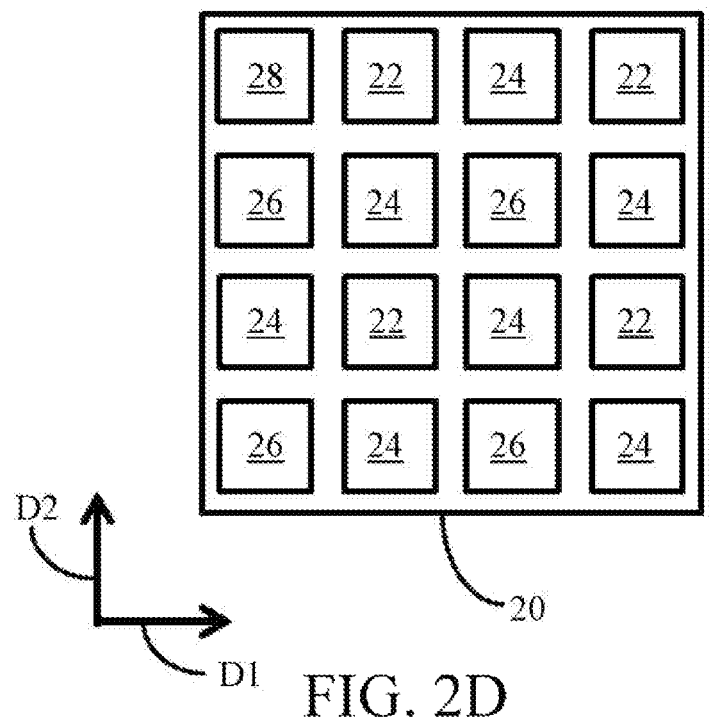
Figure 2E:
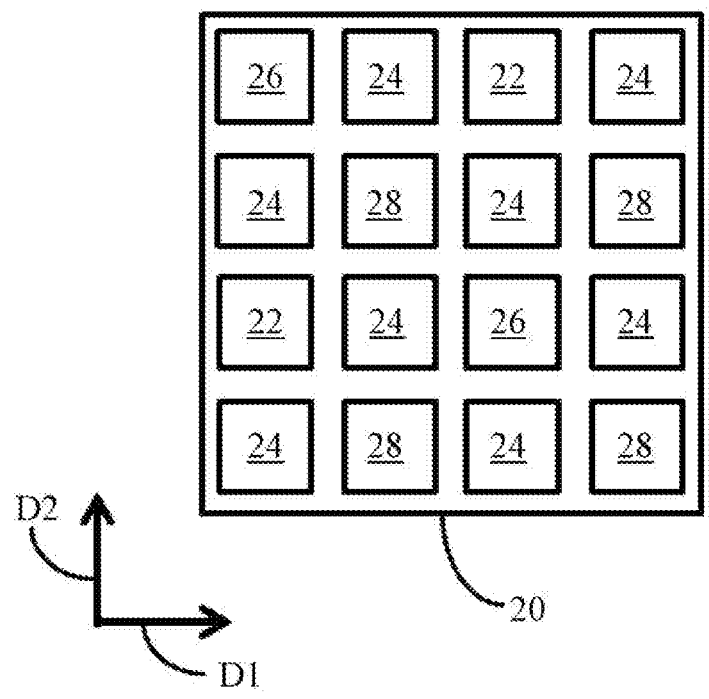

FIG. 2A to FIG. 2E are schematic diagrams of a sensing circuit according to some embodiments of this application. Referring to FIG. 2A, in some embodiments, the image capture circuit 12 has a plurality of sensing circuits 20. The sensing circuits 20 are arranged in a two-dimensional array according to the first axial direction D1 and the second axial direction D2. Each sensing circuit 20 has a red light sensor 22 (an R sensor 22 in short), a green light sensor 24 (a G sensor 24 in short), a blue light sensor 26 (a B sensor 26 in short), and an infrared sensor 28 (an IR sensor 28 in short). The R sensor 22 is located on an upper left side of each sensing circuit 20 and is configured to sense a red light signal and convert the red light signal into a corresponding electric signal. The G sensor 24 is located on an upper right side of each sensing circuit 20 and is configured to sense a green light signal and convert the green light signal into a corresponding electric signal. The B sensor 26 is located on a lower left side of each sensing circuit 20 and is configured to sense a blue light signal and convert the blue light signal into a corresponding electric signal. The IR sensor 28 is located on a lower right side of each sensing circuit 20 and is configured to sense an infrared light signal and convert the infrared light signal into a corresponding electric signal. The R, G, B, and IR sensors are also arranged in a two-dimensional array in each sensing circuit 20 according to the first axial direction D1 and the second axial direction D2, and the two-dimensional array has an equal quantity of columns and rows.

Next, in some embodiments, an area that corresponds to the R, G, B, and IR sensors separately is one original pixel in the foregoing. When the original pixel corresponds to the R sensor 22, the R subpixel value is an electric signal reading of the R sensor 22, and the G subpixel value is an average value of electric signal readings of adjacent G sensors 24, the B subpixel value is an average value of electric signal readings of adjacent B sensors 26, and the IR subpixel value is an average value of electric signal readings of adjacent IR sensors 28. When the original pixel corresponds to the G sensor 24, the B sensor 26, or the IR sensor 28, the R, G, B, and IR subpixels are obtained similarly.

Referring to FIG. 2B to FIG. 2E, in some embodiments, the original image captured by the image capture circuit 12 is presented in a Bayer pattern. Therefore, the R sensors 22, G sensors 24, B sensors 26, and IR sensors 28 are arranged in a Bayer pattern in the sensing circuit 20. An arrangement manner of the R, G, B, and IR sensors is shown in the figures. The R, G, B, and IR sensors are arranged in a two-dimensional array according to the first axial direction D1 and the second axial direction D2. The R, G, B, and IR subpixels that are missing in the original pixel may be obtained through an interpolation operation using a conventional interpolation algorithm of other R, G, B, and IR subpixels in a sensing circuit 20 in which the original pixel is located. Therefore, all original pixels have R, G, B, and IR subpixels.

Figure 3:
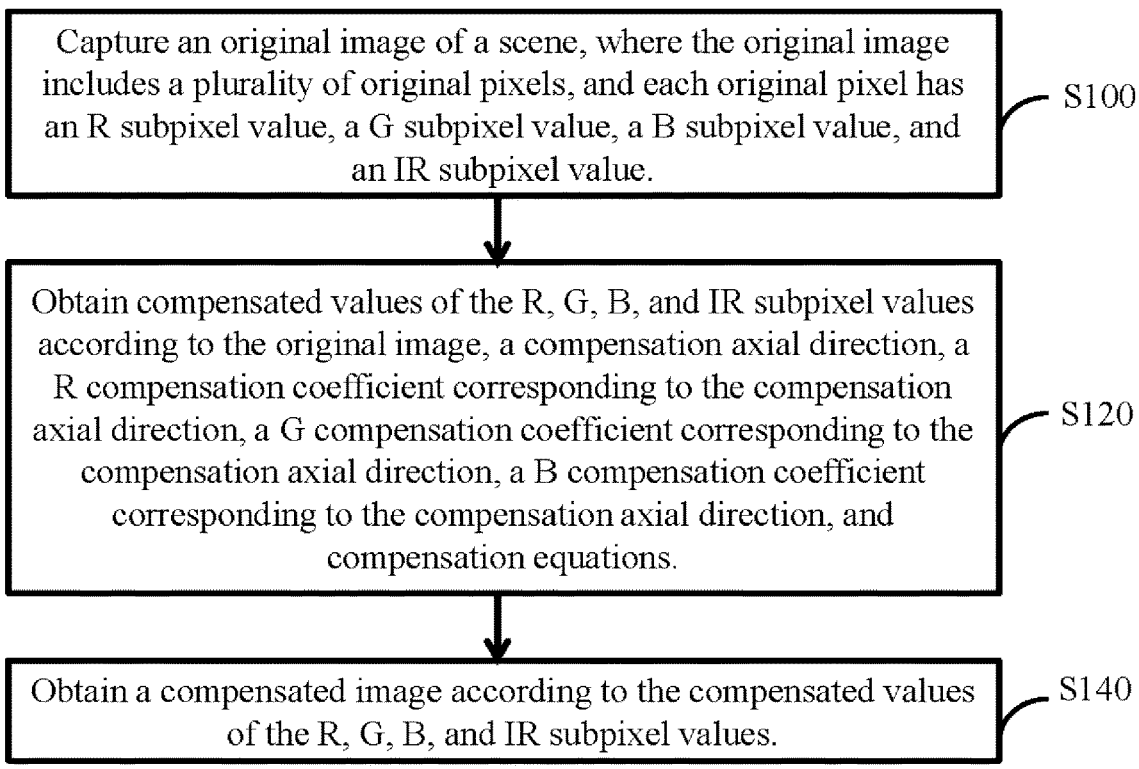
FIG. 3 is a flowchart of an infrared crosstalk compensation method according to some embodiments of this application.

FIG. 3 is a flowchart of an infrared crosstalk compensation method according to some embodiments of this application. Referring to FIG. 3, in some embodiments, the infrared crosstalk compensation method includes the following steps:

Step S100: Capture an original image of a scene, where the original image includes a plurality of original pixels, and each original pixel has an R subpixel value, a G subpixel value, a B subpixel value, and an IR subpixel value.

Step S120: Obtain compensated values of the R, G, B, and IR subpixel values according to the original image, a compensation axial direction D3, a R compensation coefficient corresponding to the compensation axial direction D3, a G compensation coefficient corresponding to the compensation axial direction D3, a B compensation coefficient corresponding to the compensation axial direction D3, and compensation equations.

Step S140: Obtain a compensated image according to the compensated values of the R, G, B, and IR subpixel values.

Figure 4:
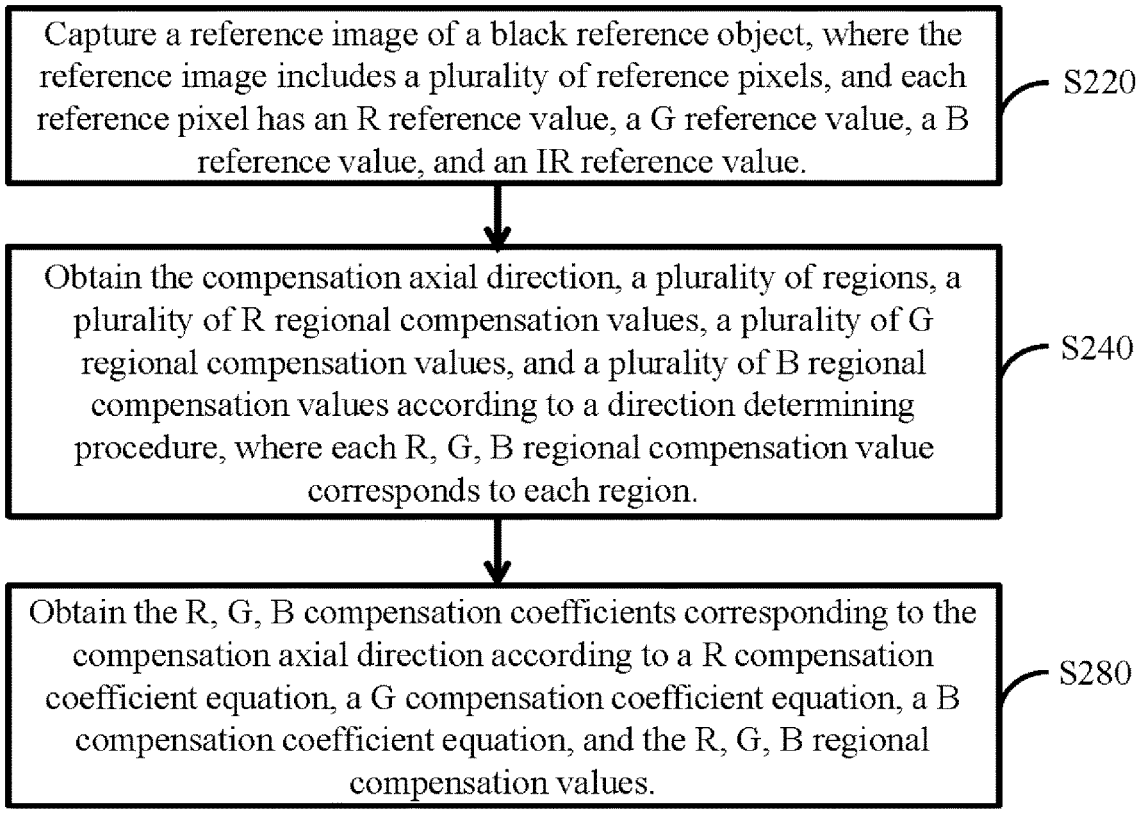
FIG. 4 is a flowchart of a method for obtaining an infrared crosstalk compensation coefficient according to some embodiments of this application.

FIG. 4 is a flowchart of a method for obtaining an infrared crosstalk compensation coefficient according to some embodiments of this application. Referring to FIG. 4, in some embodiments, the infrared crosstalk compensation method further includes a method for obtaining an infrared crosstalk compensation coefficient to obtain the R, G, B compensation coefficients. The method for obtaining an infrared crosstalk compensation coefficient includes the following steps:

Step S220: Capture a reference image 30 of a black reference object, where the reference image 30 includes a plurality of reference pixels 32, and each reference pixel 32 has an R reference value, a G reference value, a B reference value, and an IR reference value.

Step S240: Obtain the compensation axial direction D3, a plurality of regions 34, a plurality of R regional compensation values (that is, red regional compensation values), a plurality of G regional compensation values (that is, green regional compensation values), and a plurality of B regional compensation values (that is, blue regional compensation values) according to a direction determining procedure, where each R, G, B regional compensation value corresponds to each region.

Step S280: Obtain the R, G, B compensation coefficients corresponding to the compensation axial direction according to a R compensation coefficient equation (that is, red coefficient equation), a G compensation coefficient equation (that is, green coefficient equation), a B compensation coefficient equation (that is, blue coefficient equation), and the R, G, B regional compensation values.

Referring to FIG. 4 next, in some embodiments, the control circuit 14 is configured to obtain the R, G, B compensation coefficients according to a compensation coefficient obtaining procedure, where the steps included in the compensation coefficient obtaining procedure are the same as the steps included in the method for obtaining an infrared crosstalk compensation coefficient.

According to some embodiments, the reference image 30 is only captured from a scene of the black reference object rather than a scene of another non-black reference object. In addition, the black reference object is, for example, but is not limited to, a black screen, black paper, or an object having a black flat surface that reflect infrared light. The black color of the black reference object is used to avoid reflection of visible light from a background, so that it is considered that in the reference image 30, only infrared light is received, but no visible light is received. Therefore, the reference image 30 may be further used to interpret infrared crosstalk. In some embodiments, the reference image 30 may further include, in addition to the black reference object, the background of the black reference object. If the proportion of the background in the reference image 30 is relatively low, the R, G, B compensation coefficients can also be obtained.

Figure 5:
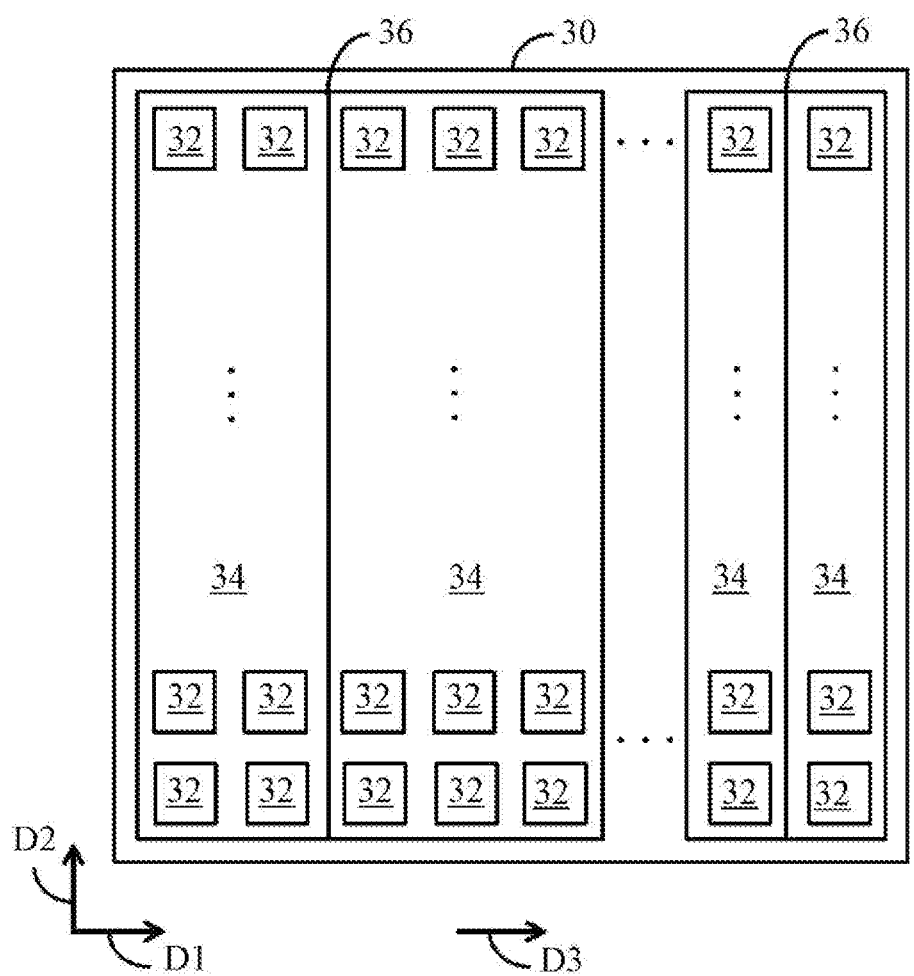
FIG. 5 is a schematic diagram of a reference image and a region according to some embodiments of this application.

FIG. 5 is a schematic diagram of a reference image and a region according to some embodiments of this application. Referring to FIG. 5, in some embodiments, the reference image 30 includes a plurality of reference pixels 32. The reference pixels 32 are arranged in a two-dimensional array according to the first axial direction D1 and the second axial direction D2. Each reference pixel 32 has an R reference value (that is, a red reference value), a G reference value (that is, a green reference value), a B reference value (that is, a blue reference value), and an IR reference value (that is, an infrared reference value).

Next, in some embodiments, a relationship in which the R, G, B, and IR sensors correspond to the reference pixels 32 is similar to a relationship in which the R, G, B, and IR sensors correspond to the original pixels. Therefore, the R, G, B, and IR reference values may be similarly obtained, and details are not described in detail herein.

Referring to FIG. 5 next, in some embodiments, the first axial direction and the second axial direction are located in a conventional xy coordinate system. The first axial direction D1 is an x axis, the second axial direction D2 is a y axis, and the reference image 30 has "a" columns and "b" rows ("a" and "b" are both constants). The regions 34 are arranged in a two-dimensional array according to the first axial direction D1 and the second axial direction D2 and do not overlap with each other. When the compensation axial direction D3 is the first axial direction D1, the regions 34 are all two-dimensional arrays having "b" rows, and a total quantity of columns of the regions 34 is "a". In contrast, when the compensation axial direction D3 is the second axial direction D2, the regions 34 are all two-dimensional arrays having "a" columns, and a total quantity of rows of the regions 34 is "b". In addition, the regions 34 are arranged according to the compensation axial direction D3. If there are "n+1" regions 34 ("n" is an integer), the regions 34 are sequentially a first region, a second region, . . . , an $n^{th}$ region, and an $(n+1)^{th}$ region. The regions 34 separately have a compensation coordinate value in the compensation axial direction D3. The compensation coordinate value is as follows: A compensation coordinate value of the first region in the compensation axial direction D3 is a coordinate value $v_1$ of a border 36 between the first region and the second region in the compensation axial direction D3. A compensation coordinate value of the second region in the compensation axial direction D3 is a coordinate value $v_2$ of a border 36 between the second region and the third region in the compensation axial direction D3. It is similarly derived that compensation coordinate values of the third region, . . . , and the nt region in the compensation axial direction D3 are $v_3$, . . . , and $v_n$. The $(n+1)^{th}$ region does not have a compensation coordinate value in the compensation axial direction D3. $0 \leq v_1 \leq v_2 \leq \ldots \leq v_n$.

In some embodiments, the regions 34 equally divide the reference image 30 in the compensation axial direction D3. That is, the regions 34 have the same length in the compensation axial direction D3 and have the same total quantity of the reference pixels 32. Specifically, if there are "n+1" regions 34: When the compensation axial direction D3 is the first axial direction D1, the regions 34 are all two-dimensional arrays having "a/(n+1)" columns and "b" rows. In contrast, when the compensation axial direction D3 is the second axial direction D2, the regions 34 are all two-dimensional arrays having "a" columns and "b/(n+1)" rows.

In some embodiments, the regions 34 unequally divide the reference image 30 in the compensation axial direction D3. That is, the regions 34 may have different lengths in the compensation axial direction D3, and this usually depends on differences in infrared crosstalk of the neighboring reference pixels 32: In an area having relatively large infrared crosstalk, relatively dense regions 34 are used for processing to avoid incomplete infrared crosstalk compensation. In an area having relatively small infrared crosstalk, relatively sparse regions 34 are used for processing to avoid unnecessary excess operations.

The R compensation coefficient equation is $$K_{rf}(v) = \begin{cases} K_{r1}, & v \leq v_1 \\ K_{r1} + (K_{r2} - K_{r1}) * \dfrac{v - v_1}{v_2 - v_1}, & v_1 \leq v \leq v_2 \\ \vdots & \\ K_{r(n-1)} + (K_{rn} - K_{r(n-1)}) * \dfrac{v - v_{n-1}}{v_n - v_{n-1}}, & v_{n-1} \leq v \leq v_n \\ K_{rn}, & v \geq v_n \end{cases},$$

the G compensation coefficient equation is $$K_{gf}(v) = \begin{cases} K_{g1}, & v \leq v_1 \\ K_{g1} + (K_{g2} - K_{g1}) * \dfrac{v - v_1}{v_2 - v_1}, & v_1 \leq v \leq v_2 \\ \vdots & \\ K_{g(n-1)} + (K_{gn} - K_{g(n-1)}) * \dfrac{v - v_{n-1}}{v_n - v_{n-1}}, & v_{n-1} \leq v \leq v_n \\ K_{gn}, & v \geq v_n \end{cases},$$

and
the B compensation coefficient equation is $$K_{bf}(v) = \begin{cases} K_{b1}, & v \leq v_1 \\ K_{b1} + (K_{b2} - K_{b1}) * \dfrac{v - v_1}{v_2 - v_1}, & v_1 \leq v \leq v_2 \\ \vdots & \\ K_{b(n-1)} + (K_{bn} - K_{b(n-1)}) * \dfrac{v - v_{n-1}}{v_n - v_{n-1}}, & v_{n-1} \leq v \leq v_n \\ K_{bn}, & v \geq v_n \end{cases},$$

where
v is a coordinate value of each reference pixel 32 in the compensation axial direction D3, $K_{r1}$, $K_{r2}$, . . . , and $K_{rn}$ are the R regional compensation values and are all constants (which are sequentially a first-region R compensation value, a second-region R compensation value, . . . , and a $n^{th}$-region R compensation value), $K_{g1}$, $K_{g2}$, . . . , and $K_{gn}$ are the G regional compensation values and are all constants (which are sequentially a first-region G compensation value, a second-region G compensation value, . . . , and a G $n^{th}$-region compensation value), $K_{b1}$, $K_{b2}$, . . . , and $K_{bn}$ are the B regional compensation values and are all constants (which are sequentially a first-region B compensation value, a second-region B compensation value, . . . , and a $n^{th}$-region B compensation value), and $v_1$, $v_2$, . . . , and $v_n$ are compensation coordinate values of the regions 34 in the compensation axial direction D3. $K_{rf}(v)$ is the R compensation coefficient of the original pixel whose coordinate value is v in the compensation axial direction D3, $K_{gf}(v)$ is the G compensation coefficient of the original pixel whose coordinate value is v in the compensation axial direction D3, $K_{bf}(v)$ is the B compensation coefficient of the original pixel whose coordinate value is v in the compensation axial direction D3.

In the compensation coefficient equation: When the coordinate value of the reference pixel 32 in the compensation axial direction D3 is less than the compensation coordinate value of the first region in the compensation axial direction D3, the R, G, B compensation coefficients are the first-region R compensation value, the first-region G compensation value, the first-region B compensation value, respectively. When the coordinate value of the reference pixel 32 in the compensation axial direction D3 is between the compensation coordinate values of the first region and the second region in the compensation axial direction D3, interpolation is performed on the first-region R, G, B compensation value and the second-region R, G, B compensation value according to the coordinate value of the reference pixel 32 in the compensation axial direction D3 and the compensation coordinate values of the first region and the second region in the compensation axial direction D3 to obtain the R, G, B compensation coefficient. And the R, G, B compensation coefficient when the coordinate value of the reference pixel 32 in the compensation axial direction D3 is between the compensation coordinate values of the second region and the $n^{th}$ region in the compensation axial direction D3 is similarly obtained. When the coordinate value of the reference pixel 32 in the compensation axial direction D3 is greater than the compensation coordinate value of the $n^{th}$ region in the compensation axial direction D3, the R, G, B compensation coefficient is the $n^{th}$-region R compensation value, the $n^{th}$-region G compensation value, the nt-region B compensation value, respectively.

Figure 6:
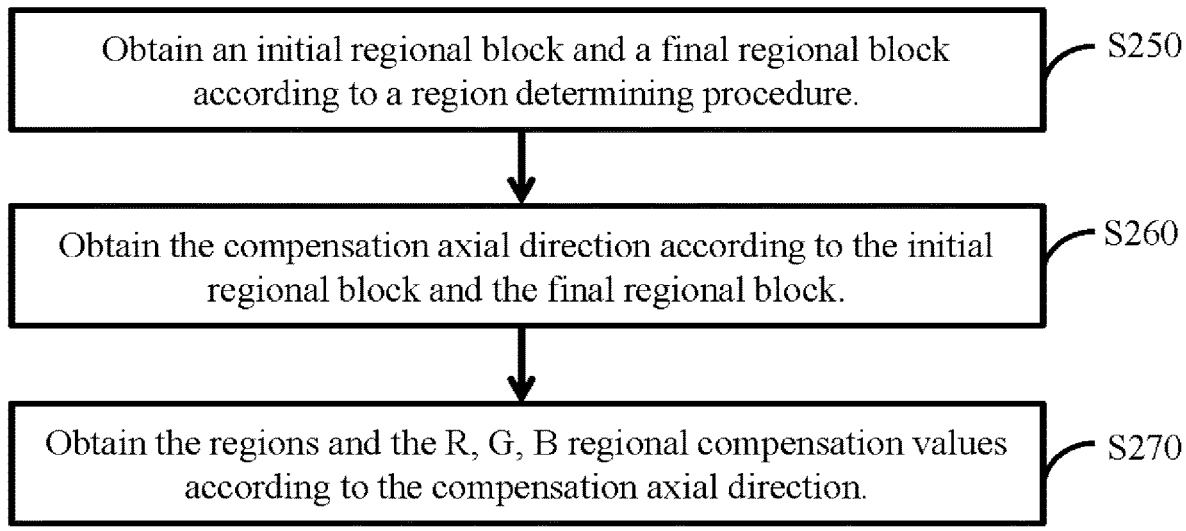
FIG. 6 is a flowchart of a direction determining procedure according to some embodiments of this application.

FIG. 6 is a flowchart of a direction determining procedure according to some embodiments of this application. Referring to FIG. 6, in some embodiments, the direction determining procedure includes the following steps:

Step S250: Obtain an initial regional block 42 and a final regional block 44 according to a region determining procedure.

Step S260: Obtain the compensation axial direction D3 according to the initial regional block 42 and the final regional block 44.

Step S270: Obtain the regions 34 and the R, G, B regional compensation values according to the compensation axial direction D3.

Figure 7:
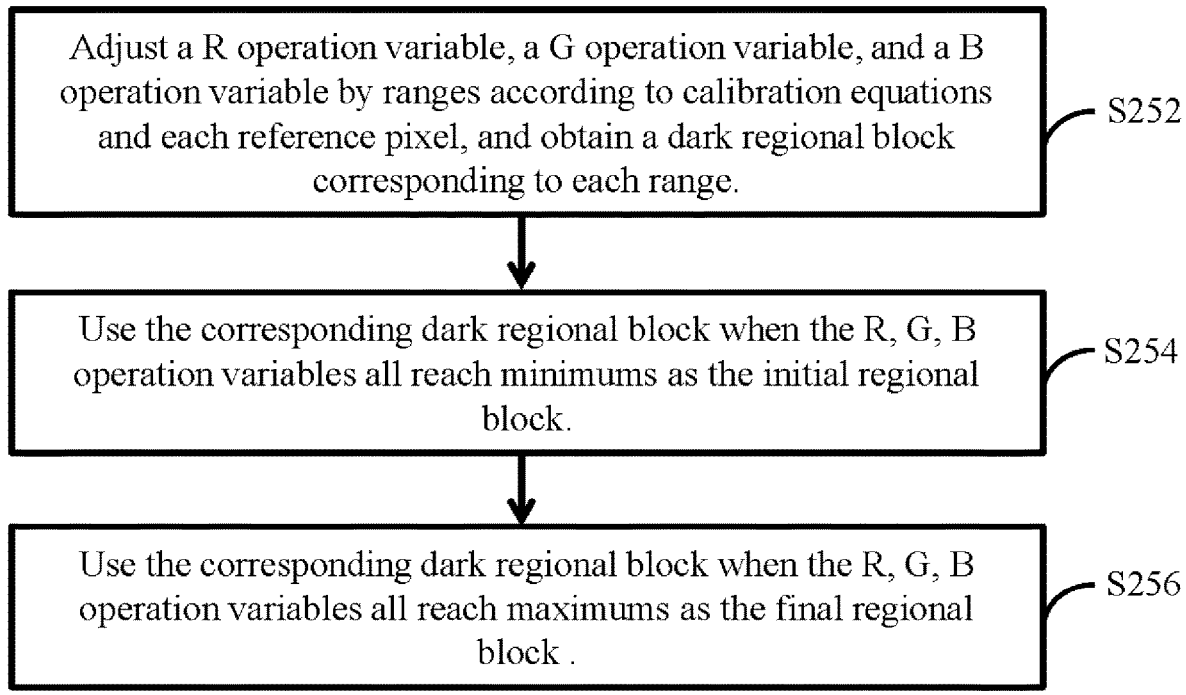
FIG. 7 is a flowchart of a region determining procedure according to some embodiments of this application.

FIG. 7 is a flowchart of a region determining procedure according to some embodiments of this application. Referring to FIG. 7, in some embodiments, the region determining procedure includes the following steps:

Step S252: Adjust a R operation variable (that is, red operation variable), a G operation variable (that is, green operation variable), and a B operation variable (that is, blue operation variable) by ranges according to calibration equations and each reference pixel 32, and obtain a dark regional block corresponding to each range.

Step S254: Use the corresponding dark regional block when the R, G, B operation variables all reach minimums as the initial regional block 42.

Step S256: Use the corresponding dark regional block when the R, G, B operation variables all reach maximums as the final regional block 44.

Figure 8A:
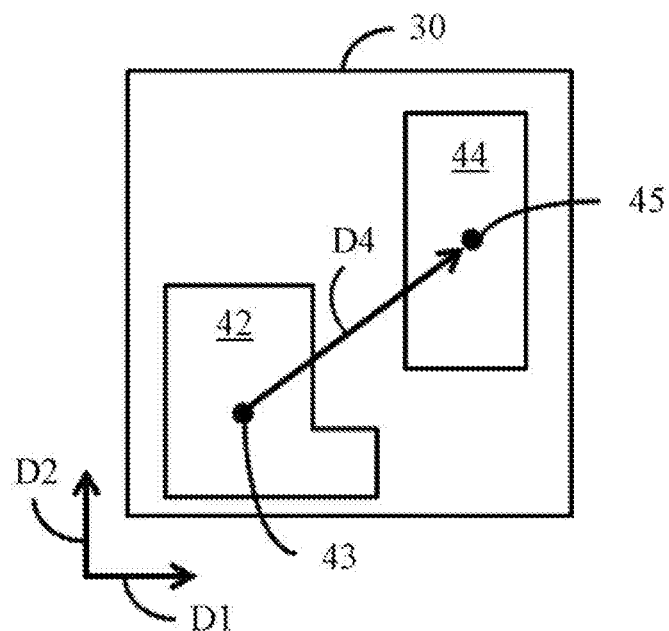
FIG. 8A is a schematic diagram of a brightness direction according to some embodiments of this application.

Referring to FIG. 8A, according to some embodiments, the initial regional block 42 and the final regional block 44 are both parts of the reference image 30. The R, G, B operation variables are adjusted by ranges. The initial regional block 42 is the corresponding dark regional block when the R, G, B operation variables all reach minimums. The final regional block is the corresponding dark regional block when the R, G, B operation variables reach maximums. The initial regional block 42 has an initial geometric center 43. The final regional block 44 has a final geometric center 45. A direction from the initial geometric center 43 to the final geometric center 45 is a brightness direction D4, and the brightness direction D4 is a vector. The distribution of impact of infrared crosstalk on the reference image 30 is determined by the brightness direction D4.

Figure 8B:
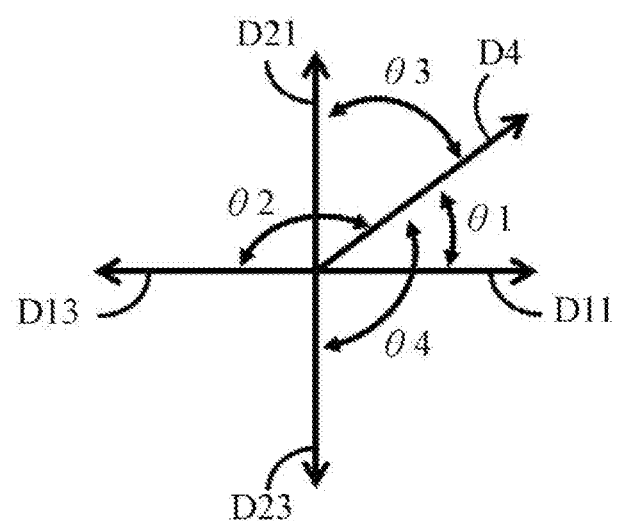
FIG. 8B is a schematic diagram of determining a compensation axial direction according to some embodiments of this application.

Referring to FIG. 8B, in some embodiments, the compensation axial direction D3 is determined by the size of an internal included angle between the first axial direction D1 and the brightness direction D4 and the size of an internal included angle between the second axial direction D2 and the brightness direction D4. Four cases are included: In a first case, when an internal included angle θ1 between a positive direction D11 of the first axial direction and the brightness direction D4 is not greater than 45 degrees, the first axial direction D1 is the compensation axial direction D3. In a second case, when an internal included angle θ2 between a negative direction D13 of the first axial direction and the brightness direction D4 is not greater than 45 degrees, the first axial direction D1 is the compensation axial direction D3. In a third case, when an internal included angle θ3 between a positive direction D21 of the second axial direction and the brightness direction D4 is less than 45 degrees, the second axial direction D2 is the compensation axial direction D3. In a fourth case, when an internal included angle θ4 between a negative direction D23 of the second axial direction and the brightness direction D4 is less than 45 degrees, the second axial direction D2 is the compensation axial direction D3.

In some embodiments, according to the compensation axial direction D3, the regions 34 and the R, G, B regional compensation values are further obtained. The regions 34 are arranged according to a positive direction of the compensation axial direction D3. In the first case and the third case, relationships among the R, G, B regional compensation values are $K_{r1} \leq K_{r2} \leq \ldots \leq K_{rn}$, $K_{g1} \leq K_{g2} \leq \ldots \leq K_{gn}$, and $K_{b1} \leq K_{b2} \leq \ldots \leq K_{bn}$, respectively. In contrast, in the second case and the fourth case, relationships among the R, G, B regional compensation values are $K_{r1} \geq K_{r2} \geq \ldots \geq K_{rn}$, $K_{g1} \geq K_{g2} \geq \ldots \geq K_{gn}$, and $K_{b1} \geq K_{b2} \geq \ldots \geq K_{bn}$, respectively.

The calibration equations are:

$$R_o = R_i - c_r * IR_i,$$

$$G_o = G_i - c_g * IR_i, \text{ and}$$

$$B_o = B_i - c_b * IR_i, \text{ where}$$

$c_r$ is the R operation variable, $c_g$ is the G operation variable, $c_b$ is the B operation variable. $R_i$ is the R reference value, $G_i$ is the G reference value, $B_i$ is the B reference value, $IR_i$ is the IR reference value, $R_o$ is an R compensated reference value, $G_o$ is a G compensated reference value, and $B_o$ is a B compensated reference value.

Specifically, the corresponding R, G, B compensated reference values of the reference pixel 32 are obtained according to the calibration equation and the R, G, B operation variable. The dark regional blocks are a set of reference pixels 32 whose R, G, B compensated reference values are all zero (in short, a reference pixel 32 whose R, G, and B compensated reference values are all zero is a dark pixel). Therefore, when the R, G, B operation variables is adjusted by ranges in ascending order, dark regional blocks in ascending order may be respectively obtained, and the distribution of impact of infrared crosstalk on the reference image 30 is determined accordingly. If the reference pixel 32 needs larger R, G, B operation variables to turn into a dark pixel, it represents that the impact of infrared crosstalk on the reference pixel 32 is severer. In contrast, if the reference pixel 32 only needs very small R, G, B operation variables or R, G, B operation variables of 0 to turn into a dark pixel, it represents that the impact of infrared crosstalk on the reference pixel 32 is slight.

In some embodiments, when the R, G, B operation variables all reach minimums, a percentage of a quotient value of dividing a quantity of dark pixels (where in short, the quantity of dark pixels is a total dark pixel quantity) by a total quantity of reference pixels 32 in the reference image 30 (where in short, the total quantity of reference pixels 32 in the reference image 30 is a total reference pixel quantity) is 10%. For the R, G, B operation variables in a next range, the percentage of the quotient value of dividing the total dark pixel quantity by the total reference pixel quantity is 20%, and increases by 10% in each range. When the R, G, B operation variables all reach maximums, the percentage of the quotient value of dividing the total dark pixel quantity by the total reference pixel quantity is 90%.

In some embodiments, regional compensation values of the dark pixels are sequentially the R, G, B operation variable adjusted by ranges. Specifically, if there are n+1 regions 34: When the R, G, B operation variables are the first-region R compensation value, the first-region G compensation value, the first-region B compensation value, respectively, a corresponding dark regional block is obtained according to the calibration equation, and a quotient value of dividing the total dark pixel quantity by the total reference pixel quantity of the dark regional block is 1/(n+1). When the R, G, B operation variables are the second-region R, G, B compensation values, . . . , or the $n^{th}$-region R, G, B compensation values, a plurality of corresponding dark regional block is obtained according to the calibration equation, and quotient values of dividing the total dark pixel quantities by the total reference pixel quantities of the dark regional blocks are 2/(n+1), . . . , and n/(n+1).

In some embodiments, when there is a reference pixel 32 whose R, G, and B reference values are all 0, the adjustment of the R, G, B operation variables by ranges may be changed into the adjustment according to an increased percentage of dark pixels (when the increased percentage of dark pixels is 100%, that is, all the reference pixels 32 are dark pixels). Therefore, when the R, G, B operation variables all reach minimums, the increased percentage of dark pixels is 10%. For the R, G, B operation variables in a next range, the increased percentage of dark pixels is 20%, and the percentage increases by 10% in each range. When the R, G, B operation variables all reach maximums, the increased percentage of dark pixels is 90%.

In some embodiments, the R, G, B, and IR reference values, the R, G, B, and IR subpixel values, and the R, G, and B compensated reference values are all integers between 0 and 255, and separately correspond to grayscale values of brightness of colors represented by the values. When the R, G, B, and IR reference values, the R, G, B, and IR subpixels, and the R, G, and B compensated reference values are less than 0 after operation, the values are 0. In contrast, when the values are greater than 255 after operation, the values are 255.

In conclusion, the infrared crosstalk compensation method and the apparatus thereof according to this application are suitable for compensating for an original image having infrared crosstalk, and original pixels are compensated for according to the R, G, B compensation coefficients corresponding to a compensation axial direction and an IR subpixel value, so as to effectively reduce the infrared crosstalk in the original image. In some embodiments, the R, G, B compensation coefficients corresponding to the compensation axial direction are adjusted according to the regions and the R, G, B regional compensation values, so that the objective of compensating for infrared crosstalk is further achieved.

What is claimed is:

1. An infrared crosstalk compensation method, comprising:

capturing an original image of a scene, wherein the original image comprises a plurality of original pixels, the original pixels are arranged in a two-dimensional array according to a first axial direction and a second axial direction, and each original pixel has an R subpixel value, a G subpixel value, a B subpixel value, and an IR subpixel value;

obtaining compensated values of the R, G, B, and IR subpixel values according to the original image, an infrared crosstalk compensation axial direction, a R compensation coefficient corresponding to the infrared crosstalk compensation axial direction, a G compensation coefficient corresponding to the infrared crosstalk compensation axial direction, a B compensation coefficient corresponding to the infrared crosstalk compensation axial direction, and compensation equations, wherein the compensation equations are:

$R_o = R_i - K_{rf}(v) * IR_i,$ $G_o = G_i - K_{gf}(v) * IR_i,$ $B_o = B_i - K_{bf}(v) * IR_i,$ and $IR_o = IR_i,$ wherein v is a coordinate value of each original pixel in the infrared crosstalk compensation axial direction, $R_i$, $G_i$, $B_i$, and $IR_i$ are the R, G, B, and IR subpixel values of an original pixel whose coordinate value is v in the infrared crosstalk compensation axial direction, $R_o$, $G_o$, $B_o$, and $IR_o$ are compensated values of R, G, B, and IR subpixel values of an original pixel whose coordinate value is v in the infrared crosstalk compensation axial direction, and $K_{rf}(v)$, $K_{gf}(v)$, $K_{bf}(v)$ are the R, G, B compensation coefficients corresponding to the original pixel whose coordinate value is v in the infrared crosstalk compensation axial direction; and obtaining a compensated image according to the compensated values of the R, G, B, and IR subpixel values;

wherein, the infrared crosstalk compensation method further comprises an infrared crosstalk compensation coefficient obtaining method for obtaining the R, G, B compensation coefficients, wherein the infrared crosstalk compensation coefficient obtaining method comprises:

capturing a reference image of a black reference object, wherein the reference image comprises a plurality of reference pixels, the reference pixels are arranged in a two-dimensional array according to the first axial direction and the second axial direction, and each reference pixel has an R reference value, a G reference value, a B reference value, and an IR reference value;

obtaining the infrared crosstalk compensation axial direction, a plurality of regions, a plurality of R regional compensation values, a plurality of G regional compensation values, and a plurality of B regional compensation values according to an infrared crosstalk direction determining procedure, wherein each R, G, B regional compensation value corresponds to each region; and obtaining the R, G, B compensation coefficients corresponding to the infrared crosstalk compensation axial direction according to a R compensation coefficient equation, a G compensation coefficient equation, a B compensation coefficient equation, and the R, G, B regional compensation values, wherein the R compensation coefficient equation is $$K_{rf}(v) = \begin{cases} K_{r1}, & v \leq v_1 \\ K_{r1} + (K_{r2} - K_{r1}) * \dfrac{v - v_1}{v_2 - v_1}, & v_1 \leq v \leq v_2 \\ \vdots & \vdots \\ K_{r(n-1)} + (K_{rn} - K_{r(n-1)}) * \dfrac{v - v_{n-1}}{v_n - v_{n-1}}, & v_{n-1} \leq v \leq v_n \\ K_{rn}, & v \geq v_n \end{cases},$$

the G compensation coefficient equation is $$K_{gf}(v) = \begin{cases} K_{g1}, & v \leq v_1 \\ K_{g1} + (K_{g2} - K_{g1}) * \dfrac{v - v_1}{v_2 - v_1}, & v_1 \leq v \leq v_2 \\ \vdots & \vdots \\ K_{g(n-1)} + (K_{gn} - K_{g(n-1)}) * \dfrac{v - v_{n-1}}{v_n - v_{n-1}}, & v_{n-1} \leq v \leq v_n \\ K_{gn}, & v \geq v_n \end{cases},$$

and the B compensation coefficient equation is $$K_{bf}(v) = \begin{cases} K_{b1}, & v \leq v_1 \\ K_{b1} + (K_{b2} - K_{b1}) * \dfrac{v - v_1}{v_2 - v_1}, & v_1 \leq v \leq v_2 \\ \vdots & \vdots \\ K_{b(n-1)} + (K_{bn} - K_{b(n-1)}) * \dfrac{v - v_{n-1}}{v_n - v_{n-1}}, & v_{n-1} \leq v \leq v_n \\ K_{bn}, & v \geq v_n \end{cases},$$

wherein v is a coordinate value of each reference pixel in the infrared crosstalk compensation axial direction, $K_{r1}$, $K_{r2}$, ..., and $K_{rn}$ are the R regional compensation values, $K_{g1}$, $K_{g2}$, ..., and $K_{gN}$ are the G regional compensation values, $K_{b1}$, $K_{b2}$, ..., and $K_{bn}$ are the B regional compensation values, $v_1$, $v_2$, ..., and $v_n$ are coordinate values of the regions in the infrared crosstalk compensation axial direction, and $K_{rf}(v)$, $K_{gf}(v)$, $K_{bf}(v)$ are the R, G, B compensation coefficients corresponding to the original pixel whose coordinate value is v in the infrared crosstalk compensation axial direction.

2. The infrared crosstalk compensation method according to claim 1, wherein the infrared crosstalk direction determining procedure comprises:
obtaining an initial regional block and a final regional block according to a region determining procedure, wherein the region determining procedure comprises:
adjusting a R operation variable, a G operation variable, and a B operation variable by ranges according to calibration equations and each reference pixel, and obtaining a dark regional block corresponding to each range, wherein the calibration equations are:

$$R_o = R_i - c_r * IR_i,$$

$$G_o = G_i - c_g * IR_i, \text{ and}$$

$$B_o = B_i - c_b * IR_i, \text{ wherein}$$

$c_r$ is the R operation variable, $c_g$ is the G operation variable, $c_b$ is the B operation variable, $R_i$ is the R reference value, G is the G reference value, $B_i$ is the B reference value, $IR_i$ is the IR reference value, $R_o$ is an R compensated reference value, $G_o$ is a G compensated reference value, and $B_o$ is a B compensated reference value;

using the corresponding dark regional block when the R, G, B operation variables all reach minimums as the initial regional block; and
using the corresponding dark regional block when the R, G, B operation variables all reach maximums as the final regional block;
obtaining the infrared crosstalk compensation axial direction according to the initial regional block and the final regional block; and
obtaining the regions and the R, G, B regional compensation values according to the infrared crosstalk compensation axial direction.

3. An infrared crosstalk compensation coefficient obtaining method, comprising:
capturing a reference image of a black reference object, wherein the reference image comprises a plurality of reference pixels, the reference pixels are arranged in a two-dimensional array according to a first axial direction and a second axial direction, and each reference pixel has an R reference value, a G reference value, a B reference value, and an IR reference value;
obtaining an infrared crosstalk compensation axial direction, a plurality of regions, a plurality of R regional compensation values, a plurality of G regional compensation values, and a plurality of B regional compensation values according to an infrared crosstalk direction determining procedure, wherein each R, G, B regional compensation value corresponds to each region; and
obtaining the R, G, B compensation coefficients corresponding to the infrared crosstalk compensation axial direction according to a R compensation coefficient equation, a G compensation coefficient equation, a B compensation coefficient equation, and the R, G, B regional compensation values, wherein the R compensation coefficient equation is $$K_{rf}(v) = \begin{cases} K_{r1}, & v \leq v_1 \\ K_{r1} + (K_{r2} - K_{r1}) * \dfrac{v - v_1}{v_2 - v_1}, & v_1 \leq v \leq v_2 \\ \vdots & \vdots \\ K_{r(n-1)} + (K_{rn} - K_{r(n-1)}) * \dfrac{v - v_{n-1}}{v_n - v_{n-1}}, & v_{n-1} \leq v \leq v_n \\ K_{rn}, & v \geq v_n \end{cases},$$

the G compensation coefficient equation is $$K_{gf}(v) = \begin{cases} K_{g1}, & v \leq v_1 \\ K_{g1} + (K_{g2} - K_{g1}) * \dfrac{v - v_1}{v_2 - v_1}, & v_1 \leq v \leq v_2 \\ \vdots & \\ K_{g(n-1)} + (K_{gn} - K_{g(n-1)}) * \dfrac{v - v_{n-1}}{v_n - v_{n-1}}, & v_{n-1} \leq v \leq v_n \\ K_{gn}, & v \geq v_n \end{cases},$$

and the B compensation coefficient equation is $$K_{bf}(v) = \begin{cases} K_{b1}, & v \leq v_1 \\ K_{b1} + (K_{b2} - K_{b1}) * \dfrac{v - v_1}{v_2 - v_1}, & v_1 \leq v \leq v_2 \\ \vdots & \\ K_{b(n-1)} + (K_{bn} - K_{b(n-1)}) * \dfrac{v - v_{n-1}}{v_n - v_{n-1}}, & v_{n-1} \leq v \leq v_n \\ K_{bn}, & v \geq v_n \end{cases},$$

wherein v is a coordinate value of each reference pixel in the infrared crosstalk compensation axial direction, $K_{r1}$, $K_{r2}$, . . . , and $K_{rn}$ are the R regional compensation values, $K_{g1}$, $K_{g2}$, . . . , and $K_{gn}$ are the G regional compensation values, $K_{b1}$, $K_{b2}$, . . . , and $K_{bn}$ are the B regional compensation values, $v_1$, $v_2$, . . . , and $v_n$ are coordinate values of the regions in the infrared crosstalk compensation axial direction, and $K_{rf}(v)$, $K_{bf}(v)$, $K_{bf}(v)$ are the R, G, B compensation coefficients corresponding to an original pixel whose coordinate value is v in the infrared crosstalk compensation axial direction.

4. The infrared crosstalk compensation coefficient obtaining method according to claim 3, wherein the infrared crosstalk direction determining procedure comprises:

obtaining an initial regional block and a final regional block according to a region determining procedure, wherein the region determining procedure comprises:
adjusting a R operation variable, a G operation variable, and a B operation variable by ranges according to calibration equations and each reference pixel, and obtaining a dark regional block corresponding to each range, wherein the calibration equations are:

$R_o = R_i - c_r * IR_i,$ $G_o = G_i - c_g * IR_i,$ and $B_o = B_i - c_b * IR_i,$ wherein $c_r$ is the R operation variable, $c_g$ is the G operation variable, $c_b$ is the B operation variable, $R_i$ is the R reference value, $G_i$ is the G reference value, $B_i$ is the B reference value, $IR_i$ is the IR reference value, $R_o$ is an R compensated reference value, $G_o$ is a G compensated reference value, and $B_o$ is a B compensated reference value;

using the corresponding dark regional block when the R, G, B operation variables all reach minimums as the initial regional block; and using the corresponding dark regional block when the R, G, B operation variables all reach maximums as the final regional block;

obtaining the infrared crosstalk compensation axial direction according to the initial regional block and the final regional block; and obtaining the regions and the R, G, B regional compensation values according to the infrared crosstalk compensation axial direction.

5. An infrared crosstalk compensation apparatus comprises:

an image capture circuit, configured to capture an original image of a scene, wherein the original image comprises a plurality of original pixels, the original pixels are arranged in a two-dimensional array according to a first axial direction and a second axial direction, and each original pixel has an R subpixel value, a G subpixel value, a B subpixel value, and an IR subpixel value; and a control circuit, configured to: obtain compensated values of the R, G, B, and IR subpixel values according to the original image, an infrared crosstalk compensation axial direction, a R compensation coefficient corresponding to the infrared crosstalk compensation axial direction, a G compensation coefficient corresponding to the infrared crosstalk compensation axial direction, a B compensation coefficient corresponding to the infrared crosstalk compensation axial direction, and compensation equations, and output a compensated image according to the compensated values of the R, G, B, and IR subpixel values, wherein the compensation equations are:

$R_o = R_i - K_{rf}(v) * IR_i,$ $G_o = G_i - K_{gf}(v) * IR_i,$ $B_o = B_i - K_{bf}(v) * IR_i,$ and $IR_o = IR_i,$ wherein v is a coordinate value of each original pixel in the infrared crosstalk compensation axial direction, $R_i$, $G_i$, $B_i$, and $IR_i$ are the R, G, B, and IR subpixel values of an original pixel whose coordinate value is i in the infrared crosstalk compensation axial direction, $R_o$, $G_o$, $B_o$, and $IR_o$ are compensated values of R, G, B, and IR subpixel values of an original pixel whose coordinate value is v in the infrared crosstalk compensation axial direction, and $K_{rf}(v)$, $K_{gf}(v)$, $K_{bf}(v)$ are the R, G, B compensation coefficients of the original pixel whose coordinate value is v in the infrared crosstalk compensation axial direction;

wherein, the control circuit is configured to obtain the R, G, B compensation coefficients according to an infrared crosstalk compensation coefficient obtaining procedure, wherein the infrared crosstalk compensation coefficient obtaining procedure comprises:

capturing a reference image of a black reference object, wherein the reference image comprises a plurality of reference pixels, the reference pixels are arranged in a two-dimensional array according to the first axial direction and the second axial direction, and each reference pixel has an R reference value, a G reference value, a B reference value, and an IR reference value;

obtaining the infrared crosstalk compensation axial direction, a plurality of regions, a plurality of R regional compensation values, a plurality of G regional compensation values, and a plurality of B regional compensation values according to an infrared crosstalk direction determining procedure, wherein each R, G, B regional compensation value corresponds to each region; and obtaining the R, G, B compensation coefficients corresponding to the infrared crosstalk compensation axial direction according to a R compensation coefficient equation, a G compensation coefficient equation, a B compensation coefficient equation, and the regional compensation values, wherein the R compensation coefficient equation is $$K_{rf}(v) = \begin{cases} K_{r1}, & v \leq v_1 \\ K_{r1} + (K_{r2} - K_{r1}) * \dfrac{v - v_1}{v_2 - v_1}, & v_1 \leq v \leq v_2 \\ \vdots & \\ K_{r(n-1)} + (K_{rn} - K_{r(n-1)}) * \dfrac{v - v_{n-1}}{v_n - v_{n-1}}, & v_{n-1} \leq v \leq v_n \\ K_{rn}, & v \geq v_n \end{cases},$$

the G compensation coefficient equation is $$K_{gf}(v) = \begin{cases} K_{g1}, & v \leq v_1 \\ K_{g1} + (K_{g2} - K_{g1}) * \dfrac{v - v_1}{v_2 - v_1}, & v_1 \leq v \leq v_2 \\ \vdots & \\ K_{g(n-1)} + (K_{gn} - K_{g(n-1)}) * \dfrac{v - v_{n-1}}{v_n - v_{n-1}}, & v_{n-1} \leq v \leq v_n \\ K_{gn}, & v \geq v_n \end{cases},$$

and the B compensation coefficient equation is $$K_{bf}(v) = \begin{cases} K_{b1}, & v \leq v_1 \\ K_{b1} + (K_{b2} - K_{b1}) * \dfrac{v - v_1}{v_2 - v_1}, & v_1 \leq v \leq v_2 \\ \vdots & \\ K_{b(n-1)} + (K_{bn} - K_{b(n-1)}) * \dfrac{v - v_{n-1}}{v_n - v_{n-1}}, & v_{n-1} \leq v \leq v_n \\ K_{bn}, & v \geq v_n \end{cases},$$

wherein
v is a coordinate value of each reference pixel in the infrared crosstalk compensation axial direction, $K_{r1}$, $K_{r2}$, ..., and $K_{rn}$ are the R regional compensation values, $K_{g1}$, $K_{g2}$, ..., and $K_{gn}$ are the G regional compensation values, $K_{b1}$, $K_{b2}$, ..., and $K_{bn}$ are the B regional compensation values, $v_1$, $v_2$, ..., and $v_n$ are coordinate values of the regions in the infrared crosstalk compensation axial direction, and $K_{rf}(v)$, $K_{gf}(v)$, $K_{bf}(v)$ are the R, G, B compensation coefficients of an original pixel whose coordinate value is v in the infrared crosstalk compensation axial direction.

6. The infrared crosstalk compensation apparatus according to claim 5, further comprising an image display apparatus, configured to display the compensated image.

7. The infrared crosstalk compensation apparatus according to claim 5, further comprising a storage apparatus, configured to store the compensated image.

8. The infrared crosstalk compensation apparatus according to claim 5, wherein the infrared crosstalk direction determining procedure comprises:

obtaining an initial regional block and a final regional block according to a region determining procedure, wherein the region determining procedure comprises:
adjusting a R operation variable, a G operation variable, and a B operation variable by ranges according to calibration equations and each reference pixel, and obtaining a dark regional block corresponding to each range, wherein the calibration equations are:

$R_o = R_i - c_r * IR_i$, $G_o = G_i - c_g * IR_i$, and $B_o = B_i - c_b * IR_i$, wherein $c_r$ is the R operation variable, $c_g$ is the G operation variable, $c_b$ is the B operation variable, $R_i$ is the R reference value, $G_i$ is the G reference value, $B_i$ is the B reference value, $IR_i$ is the IR reference value, $R_o$ is an R compensated reference value, $G_o$ is a G compensated reference value, and $B_o$ is a B compensated reference value;

using the corresponding dark regional block when the R, G, B operation variables all reach minimums as the initial regional block; and using the corresponding dark regional block when the R, G, B operation variables all reach maximums as the final regional block;

obtaining the infrared crosstalk compensation axial direction according to the initial regional block and the final regional block; and obtaining the regions and the R, G, B regional compensation values according to the infrared crosstalk compensation axial direction.

\* \* \* \* \*